United States Patent [19]
Raymond

[11] 4,139,778
[45] Feb. 13, 1979

[54] SWIVEL BASE FOR FUEL ASSEMBLY STORAGE
[75] Inventor: Theodore E. Raymond, Swansea, S.C.
[73] Assignee: Westinghouse Electric Corp., Pittsburgh, Pa.
[21] Appl. No.: 764,787
[22] Filed: Feb. 2, 1977
[51] Int. Cl.² ............................................. G21F 5/00
[52] U.S. Cl. ..................................... 250/507; 176/87
[58] Field of Search .................... 176/30, 87; 250/506, 250/507–513

[56] References Cited
U.S. PATENT DOCUMENTS

| | | | |
|---|---|---|---|
| 3,145,636 | 8/1964 | Hall et al. | 176/30 X |
| 3,229,096 | 1/1966 | Bonilla et al. | 250/507 |
| 3,604,934 | 9/1971 | Metillo et al. | 250/507 X |
| 3,787,699 | 1/1974 | Menachem et al. | 250/507 |
| 3,823,065 | 7/1974 | Jones | 176/87 X |
| 3,886,368 | 5/1975 | Rollins et al. | 250/507 |
| 4,036,686 | 7/1977 | Weilbacher et al. | 176/30 X |

Primary Examiner—Peter A. Nelson
Attorney, Agent, or Firm—L. A. DePaul; Z. L. Dermer

[57] ABSTRACT

A nuclear fuel assembly storage rack having a swivel base consisting of a plurality of plates with a hard ball centered and captured between the plates. The bottom base plate is fixed to the bottom of the storage rack and the top base plate has pins for locating the bottom nozzle of the fuel assembly. Since the top of the fuel assembly is clamped in the storage rack, the swivel base allows the fuel assembly to seek a position that minimizes torsional and bending stresses in the fuel assembly.

9 Claims, 3 Drawing Figures

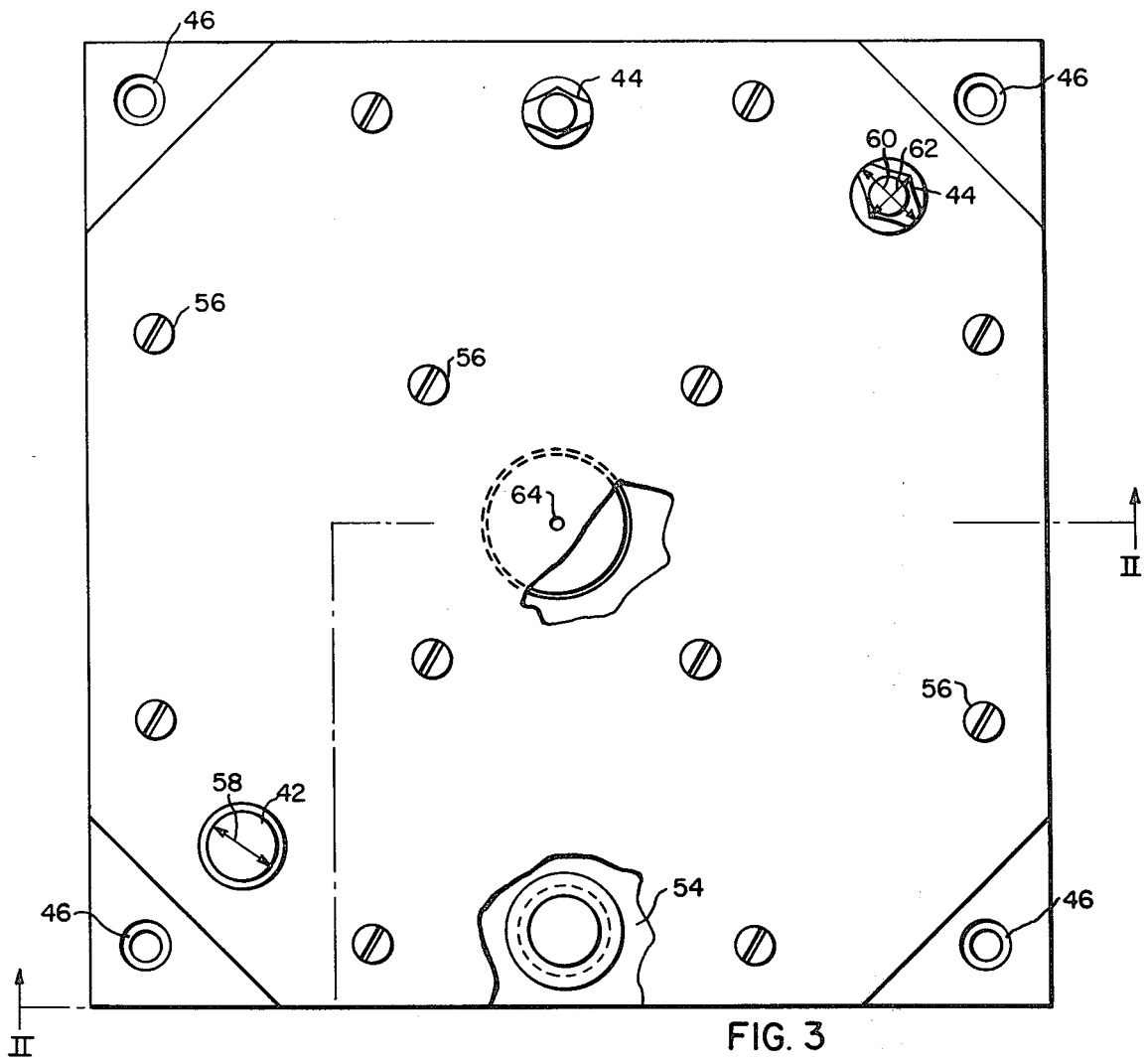
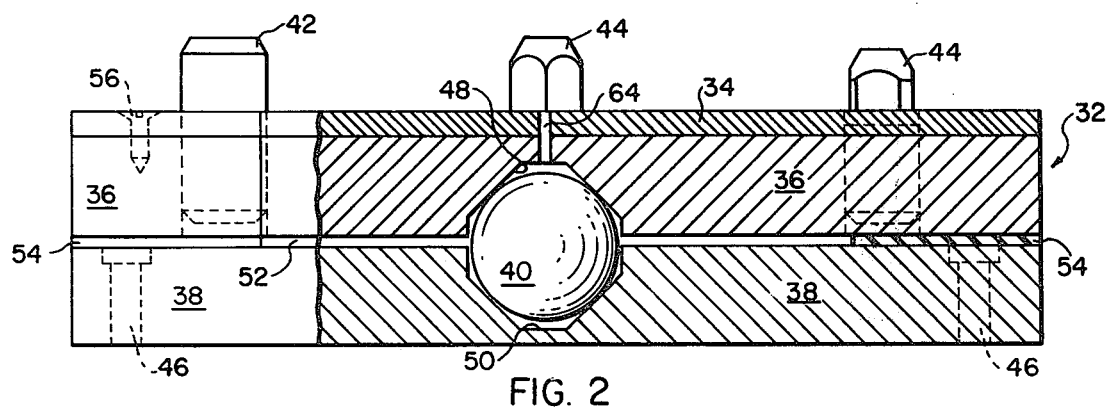

SWIVEL BASE FOR FUEL ASSEMBLY STORAGE

BACKGROUND OF THE INVENTION

This invention relates to apparatus for holding nuclear fuel assemblies and particularly to nuclear fuel assembly storage racks.

In nuclear steam supply systems well known in the art, a reactor vessel contains fuel assemblies with nuclear fuel therein which produce heat in a commonly understood fashion. The fuel assemblies may be rectangular or hexagonal arrays of fuel elements and may be approximately 150 inches in length. The fuel element may be a hollow cylindrical steel rod filled with nuclear fuel pellets as is well understood by those skilled in the art. When the fuel assemblies are placed in proper configuration within the reactor vessel, the fuel elements comprising the fuel assembly, generate heat. A coolant is circulated through the reactor vessel in heat transfer relationship with the fuel assemblies thereby transferring heat from the fuel assemblies to the coolant. The coolant may then be circulated to a location remote from the reactor vessel to generate steam and in turn generate electricity. After a period of reactor operation, the nuclear fuel in the fuel element becomes depleted necessitating replacement of the spent fuel assembly with a fresh one. The spent or depleted fuel assembly is then transferred to a storage location where it is allowed to cool to a reasonable temperature. Before and after being used in the reactor, the fuel assembly may be held upright in a storage location by a storage rack.

There are several storage rack configurations known in the art. In most of these storage racks the fuel assembly is held upright by having its upper end clamped to a supporting structure while having its lower end clamped or fitted into a socket. The fuel assemblies are separated by a sufficient distance to avoid a critical arrangement. While the clamped top end and clamped or socketed bottom end configurations provide positive retention structures, if the fuel assembly becomes slightly misaligned between clamps the configuration may result in high stresses in the fuel assembly because the configuration approximates a column with a clamped top and bottom. Thus, the slenderness of the fuel assembly and its substantial weight, which may be 1500 pounds, combined with a slight misalignment of the fuel assembly between clamps can result in excessive torsional and bending stresses in the fuel assembly. Since in many applications, these high stresses cannot be tolerated, the prior art configurations for storage racks are not suitable.

SUMMARY OF THE INVENTION

A nuclear fuel assembly storage rack having a swivel base for minimizing stresses in the fuel assembly. The storage rack consists of a mechanism for supporting a plurality of fuel assemblies from near their top end and a swivel base on which the bottom of the fuel assembly rests. The swivel base comprises two steel plates with a hard ball centered and captured between the plates and a third plate attached to the top steel plate. The bottom steel plate is attached to the bottom of the storage rack and the third plate has pins therein for maintaining proper alignment of the lower end of the fuel assembly. The upper end of the fuel assembly may be clamped to the supporting structure, while the lower end rests on the swivel base. The swivel base allows the fuel assembly to seek the least stressed condition by having the upper steel base plate pivot or rotate on the hard ball which is captured between the steel plates.

It is an object of this invention to provide a fuel assembly storage rack capable of supporting fuel assemblies while minimizing the stresses in the fuel assembly.

It is a particular object of this invention to provide a fuel assembly storage rack having a swivel base capable of supporting fuel assemblies while minimizing the stresses in the fuel assembly.

It is a more particular object of this invention to provide a fuel assembly storage rack having a swivel base with plates capable of relative motion for supporting fuel assemblies while minimizing the stresses in the fuel assembly.

BRIEF DESCRIPTION OF THE DRAWINGS

While the specification concludes with claims specifically pointing out and distinctly claiming the subject matter of the invention, it is believed the invention will be better understood from the following description taken in conjunction with the accompanying drawings, wherein:

FIG. 2 is a partial cross-sectional view in elevation of the swivel base; and

FIG. 3 is a plan view of the swivel base.

DESCRIPTION OF THE PREFERRED EMBODIMENT

Figure 1:
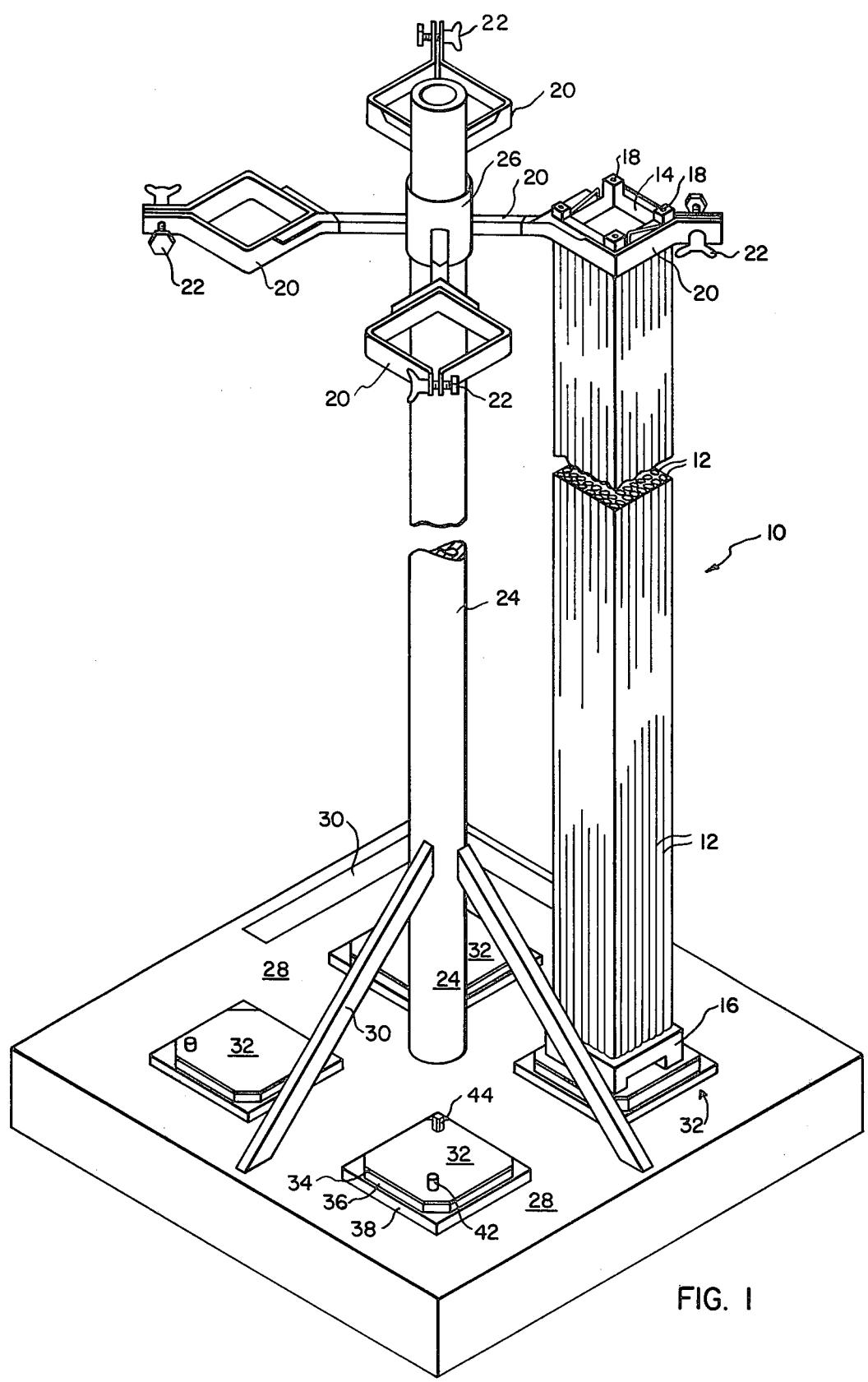
FIG. 1 is an elevational view in perspective of the fuel assembly storage rack.

In nuclear reactor systems it is necessary to store fuel assemblies before and after the fuel assemblies are used in the nuclear reactor. The invention described herein provides apparatus capable of storing such fuel assemblies without the fuel assembly developing unacceptable stresses therein.

Referring to FIG. 1, a typical ductless fuel assembly 10 comprises fuel elements 12. Fuel elements 12 may be hollow cylindrical metallic tubes filled with nuclear fuel as is well known in the art. Fuel elements 12 are held at their upper end by upper end support 14 and at their lower end by lower end support 16. Upper end support 14 and lower end support 16 are metal supports that are capable of maintaining proper alignment of fuel elements 12 within fuel assembly 10 and of providing a mechanism for attachment during transportation and reactor operation. Both upper end support 14 and lower end support 16 have openings 18 therein for accommodating alignment pins. During storage, fuel assembly 10 is supported from its upper end by clamp 20 which is a metal support conforming to the shape of upper end support 14. Once fuel assembly 10 has been placed in clamp 20 by typical fuel handling apparatus, clamp 20 may be made secure by tightening the winged nut and bolt arrangement 22 or other suitable fastening means. Clamp 20 is attached at the end opposite nut and bolt arrangement 22 to center post 24 by means well known in the art such as by sleeve 26 which may be welded to center post 24. Center post 24 may be a hollow cylindrical metal column supported vertically by its attachment to base 28 along with supporting metal struts 30. Base 28 may be either a metal plate fixed to the floor of the storage facility or it may be the floor itself. Center post 24 has four symmetrically disposed clamps 20 arranged in conjunction with struts 30 such that at least four fuel assemblies 10 may be supported from one center post 24. While fuel assembly 10 is supported from its upper end support 14 by clamp 20, the lower end support 16 rests on swivel base 32.

Referring now to FIG. 2, swivel base 32 comprises first plate 34, second plate 36, third plate 38, ball 40, circular pins 42, and diamond pins 44. Third plate 38 may be a rectangular carbon steel plate approximately one inch thick and fastened to base 28 by appropriate means such as first screws 46. Second plate 36 is a rectangular carbon steel plate approximately one inch thick with its corners removed to expose the corners of third plate 38. Second plate 36 has a first hole 48 drilled in the center thereof that is complimentary to a similar center drilled second hole 50 in third plate 38 for accommodating a hard steel ball 40. Ball 40 which may be approximately 1.5 inches in diameter rests in second hole 50 of third plate 38 while second plate 36 rests on ball 40 such that ball 40 fits into first hole 48. When second plate 36 rests on ball 40 in this arrangement, second plate 36 is separated from third plate 38 by a gap 52 which may be approximately 0.125 inch wide. A foam rubber or urethane sheet 54 with a hole therein corresponding to first hole 48 and second hole 50 may be inserted into gap 52 between second plate 36 and third plate 38 so as to prevent foreign material from becoming lodged between the plates. Second plate 36 is, thereby, capable of moving relative to third plate 38 by pivoting or rotating on ball 40. A first plate 34 which may be manufactured of nylon or stainless steel and may be approximately 0.25 inch thick is attached to the top of second plate 36 by means well known to those skilled in the art such as second screws 56. First plate 34 provides a mechanism for isolating contact of lower end support 16 from second plate 36 to thereby avoid corrosion of fuel assembly 10 because contact of fuel assembly 10 with the carbon steel of second plate 36 may cause corrosion of fuel assembly 10. Hardened round pins 42 and diamond pins 44 are press fitted through first plate 34 and into second plate 36.

Round pin 42 and diamond pin 44 are capable of fitting into openings 18 in lower end support 16 so as to engage lower end support 16 and support the weight of fuel assembly 10. Round pin 42 has a diameter 58 which may be approximately 0.8 inch and diamond pin 44 has a length 60 across farthest tips which is equal to diameter 58 while line 62 denotes the distance across the short tips of diamond pin 44 which is less than diameter 58. When fuel assembly 10 is placed on swivel base 32, a round pin 42 engages an opening 18 while a diamond pin 44 located across the center of swivel base 32 from the round pin 42 engages a similar opening 18 thereby preventing rotation of fuel assembly 10 with respect to plates 34 and 36 of swivel base 32. Line 62 being shorter than length 60 allows a fuel assembly 10 to be positioned on a round pin 42-diamond pin 44 set even though the corresponding openings 18 are separated by a distance slightly different from the distance between the pins while still preventing rotation of fuel assembly 10. A first round pin 42-diamond pin 44 set is located on first plate 34 to accommodate a fuel assembly 10 having a 14 × 14 array of fuel elements while a second set of pins are located at 45° from the first set so as to accommodate a fuel assembly 10 having a 15 × 15 array of fuel elements 12 thereby providing swivel base 32 with the capability of supporting either type of fuel assembly. Furthermore, first plate 34 and second plate 36 have a centered hole 64 therethrough that allows clamp 20 to be aligned with the center of swivel base 32 by plumb bob or other such methods.

When a typical fuel assembly 10 has been placed into clamp 20, lower end support 16 rests on swivel base 32 with a diamond pin 44 and corresponding round pin 42 engaging openings 18 of lower end support 16. While in this position the fuel assembly 10 may not be completely vertically aligned because of misalignment in clamp 20 or for other common reasons such as thermal bending. Since a typical fuel assembly 10 may be approximately 156 inches in length and weigh approximately 1500 pounds, this slight misalignment may cause severe stresses in the fuel assembly. However, because the fuel assembly 10 rests on swivel base 32, first plate 34 and second plate 36 together move relative to third plate 38 by revolving on ball 40 thereby allowing fuel assembly 10 to become aligned in a nonstressed position. When so moving, second plate 36 may either compress sheet 54 or allow sheet 54 to expand slightly. While in the prior art, a slight misalignment may have produced a high stress level in a fuel assembly without a swivel base thereby approaching the situation of a long slender column with two clamped ends, the present invention approaches the condition of a column with one end clamped and the other end pivoted. Therefore, the invention provides a fuel assembly storage rack having a swivel base with plates capable of relative motion for supporting fuel assemblies while minimizing the stresses in the fuel assembly.

While there is described what is now considered to be the preferred embodiment of the invention, it is, of course, understood that various other modifications and variations will occur to those skilled in the art. The claims, therefore, are intended to include all such modifications and variations which fall within the true spirit and scope of the present invention. For example, ball 40 may be replaced with a hemispherical member that would rest with its flat side on third plate 38 while its hemispherical side would extend into first hole 48.

I claim:

1. A nuclear fuel storage rack comprising:
   upper support means for vertically supporting a fuel assembly from said fuel assembly's upper end; and
   swivel base means having a plurality of members capable of relative motion disposed below said fuel assembly for supporting the lower end of said fuel assembly; said members moving relative to each other to thereby relieve stresses in said fuel assembly.

2. The nuclear fuel storage rack recited in claim 1 wherein said swivel base means comprises:
   a first member disposed below said fuel assembly for engaging the lower end of said fuel assembly and for supporting said fuel assembly;
   a second member disposed below said first member for supporting said first member; and
   base means disposed between said first member and said second member for allowing said first member to move relative to said second member under force from said fuel assembly while supporting said fuel assembly thereby relieving stresses in said fuel assembly.

3. The nuclear fuel storage rack recited in claim 1 wherein said swivel base means comprises:
   a plate-like first member having a first notch in its underside and being disposed below said lower end of said fuel assembly for engaging and supporting said lower end of said fuel assembly;

a plate-like second member having a second notch in its upper side corresponding to said first notch for supporting said first member; and a pivoting member disposed in said first and second notches and supporting said first member from said second member while separating said first member from said second member allowing said first member to pivot relative to said second member under the force of said fuel assembly thereby relieving stresses in said fuel assembly.

4. The nuclear fuel storage rack recited in claim 3 wherein said swivel base means further comprises:

a flexible member disposed between said first and second members for preventing foreign material from becoming lodged between said first and second members.

5. The nuclear fuel storage rack recited in claim 4 wherein said swivel base means further comprises:

a plate-like third member disposed on said first member for preventing contact between said lower end of said fuel assembly and said first member thereby preventing corrosion of said fuel assembly.

6. The nuclear fuel storage rack recited in claim 5 wherein said swivel base means further comprises:

a round pin attached to said first member for engaging said lower end of said fuel assembly; and a diamond pin attached to said first member and located across the center of said first member from said round pin for engaging said lower end of said fuel assembly, said round pin and said diamond pin together forming a means for attaching said fuel assembly to said swivel base means without allowing rotation of said fuel assembly relative to said first member.

7. The nuclear fuel storage rack recited in claim 6 wherein said flexible member is a sheet of foam rubber.

8. The nuclear fuel storage rack recited in claim 7 wherein said third member is a nylon plate.

9. The nuclear fuel storage rack recited in claim 7 wherein said third member is a stainless steel plate.

* * * * *